(12) United States Patent  
Platner

(10) Patent No.: US 7,229,079 B2
(45) Date of Patent: Jun. 12, 2007

(54) CENTER SEEKING SUSPENSION SYSTEM

(75) Inventor: David K. Platner, Shelby, MI (US)

(73) Assignee: ArvineMeritor Technology, LLC, Troy, MI (US)

(*) Notice: Subject to any disclaimer, the term of this patent is extended or adjusted under 35 U.S.C. 154(b) by 416 days.

(21) Appl. No.: 10/785,880

(22) Filed: Feb. 24, 2004

(65) Prior Publication Data
US 2005/0184477 A1  Aug. 25, 2005

(51) Int. Cl.
B60G 17/02 (2006.01)
B60G 17/0165 (2006.01)

(52) U.S. Cl. .............................. 280/5.515; 280/5.519
(58) Field of Classification Search ............ 280/5.515, 280/5.519
See application file for complete search history.

(56) References Cited

U.S. PATENT DOCUMENTS

| 3,947,004 | A | 3/1976 | Taylor |
| 3,992,035 | A | 11/1976 | Dezelan et al. |
| 5,222,759 | A | 6/1993 | Wanner |
| 5,678,847 | A | 10/1997 | Izawa et al. |
| 5,682,968 | A | 11/1997 | Boichot et al. |
| 6,371,459 | B1 | 4/2002 | Schick et al. |
| 6,389,341 | B1 | 5/2002 | Davis |

2002/0070510 A1  6/2002  Rogala

FOREIGN PATENT DOCUMENTS

| DE | 39 02 743 | 7/1990 |
| DE | 42 26 754 | 3/1993 |
| EP | 0 444 278 | 9/1991 |
| EP | 0 773 120 | 5/1997 |
| GB | 2 310 024 | 8/1997 |
| JP | 62001611 | 5/1987 |
| JP | 62289418 | 12/1987 |
| JP | 05038921 | 2/1993 |

OTHER PUBLICATIONS

European Search Report, May 13, 2005.
European Patent Application No. 05250883.5 Examination Report, dated May 18, 2006.

Primary Examiner—Paul N. Dickson
Assistant Examiner—Joselynn Y. Sliteris
(74) Attorney, Agent, or Firm—Carlson, Gaskey & Olds

(57) ABSTRACT

A suspension system includes a fluid strut, an accumulator and a reservoir. The accumulator and reservoir are in fluid communication with the fluid strut through an accumulator valve and a reservoir valve respectively. A fluid pump pressurizes the accumulator with an incompressible fluid stored in the reservoir. A piston valve is located within a piston to selectively permit fluid communication between a high pressure side and a low pressure side of the piston. A controller operates each valve and the fluid pump to control flow of the incompressible fluid within the fluid strut to obtain an infinitely variable self centering suspension system.

19 Claims, 3 Drawing Sheets

CENTER SEEKING SUSPENSION SYSTEM

BACKGROUND OF THE INVENTION

The present invention relates to a suspension system, and more particularly to an active suspension system that utilizes an incompressible fluid.

Conventional suspension systems isolate the vehicle frame or chassis from impacts and vibrations resulting from vehicle wheels traversing uneven terrain. Vehicle ride characteristics have complex dynamics. Excess vibration results in detrimental consequences.

Current passive suspension systems employ springs, struts, rubber elements, torsion bars, or the like to maintain a centered suspension. Perturbations from the norm initiates a harmonic motion that would continue indefinitely but for the addition of damping mechanisms such as shocks, or other hysterisis or coulomb damping devices. Current suspension technologies are defined in frequency domains with natural frequencies and damping coefficients to define the suspension characteristics. Such passive suspension systems offer a compromise between spring and dampening coefficients of fixed rates.

Current active suspension systems provide powered components which isolate the vehicle frame from vibrations induced by uneven terrain. In active vehicle suspension systems, actuators are provided to actively apply forces which counteract and balance forces applied to the chassis of the motor vehicle. Such active systems utilize relatively complicated control schemes to determine the amount of force which actuators should apply to the vehicle chassis to provide a smoother ride, such as schemes based on balancing the forces acting on the chassis and schemes based on supporting the vehicle chassis at a selected ride height. Active suspension systems may require relatively large power inputs to provide an actuator that is quick enough to compensate for impacts and vibrations which occur at desired traveling velocities over rough terrain. The power requirements for such fully active suspension systems are generally prohibitively demanding.

Accordingly, it is desirable to provide an active center seeking suspension system which responds rapidly while utilizing minimal power inputs and damping elements.

SUMMARY OF THE INVENTION

The suspension system according to the present invention includes a fluid strut between a sprung load such as a vehicle chassis and an unsprung load such as a vehicle suspension assembly. An accumulator and a reservoir are in fluid communication with the fluid strut through an accumulator valve and a reservoir valve respectively. A fluid pump pressurizes the accumulator with an incompressible fluid stored in the reservoir.

A piston valve is located within a piston to selectively permit fluid communication between a high pressure side and a low pressure side of the piston. A controller operates each valve and the fluid pump to control flow of the incompressible fluid within the strut. The controller operates each valve and the fluid pump to exploit the incompressible properties of the incompressible fluid to obtain an infinitely variable suspension system.

The present invention therefore provides an active center seeking suspension system which responds rapidly while utilizing minimal power inputs and damping elements.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
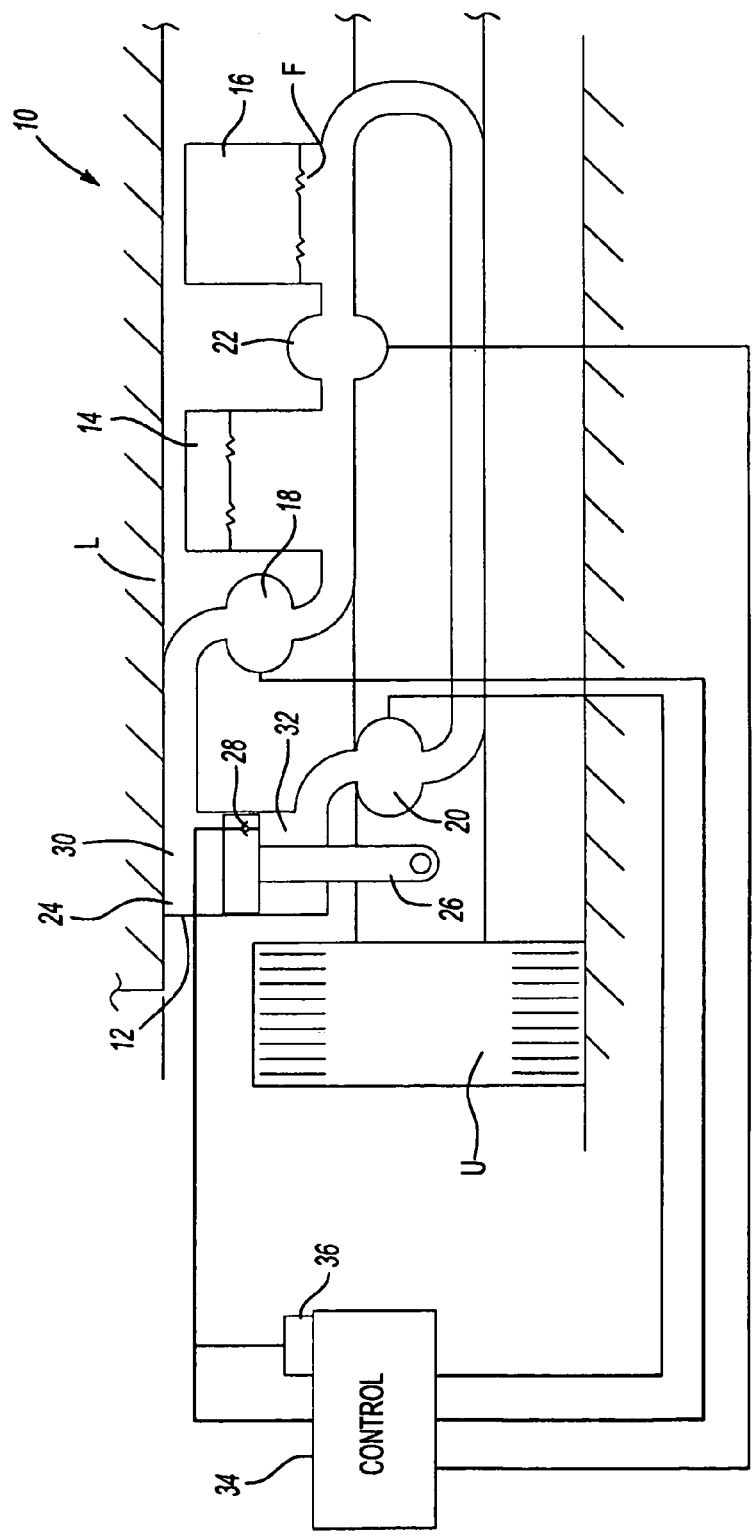
FIG. 1 is a general schematic view of an active suspension system designed according to the present invention.

FIG. 1 illustrates a general schematic view of a suspension system 10. The suspension system 10 generally includes a fluid strut 12 between a sprung load L such as a vehicle chassis and an unsprung load U such as a vehicle suspension assembly. It should be understood that although only a single suspension system 10 is disclosed in the illustrated embodiment such a suspension system will be utilized for each vehicle wheel or the like.

An accumulator 14 and a reservoir 16 are in fluid communication with the fluid strut 12 through an accumulator valve 18 and a reservoir valve 20 respectively. Preferably, the valves 18, 20 are ON/OFF (bang-bang) valves which provide extremely rapid reaction times.

A fluid pump 22 pressurizes the accumulator 14 with an incompressible fluid F stored in the reservoir 16. Preferably, the incompressible fluid F is a hydraulic fluid, however, other incompressible fluids could also be used with the present invention.

The fluid strut 12 includes a body 24 and a piston 26 movable therein. The body 24 is connected to the sprung load L and the piston 26 is connected to the unsprung load U. It should be understood that other arrangements could also be utilized with the present invention.

Figure 4:
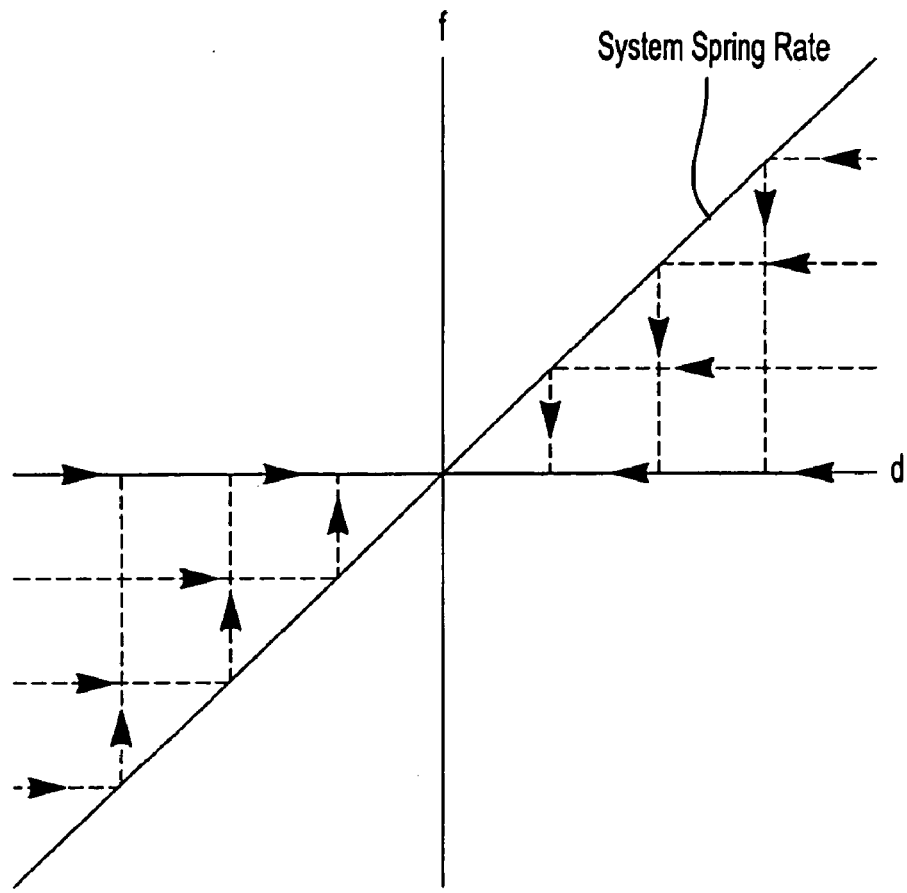
FIG. 4 is a graphical representation of an active suspension system designed according to the present invention.

A piston valve 28 is located within the piston 26 to selectively permit fluid communication between a high pressure side 30 and a low pressure side 32 of the piston 26 to effectively "dump" the force by displacing the strut 12 (FIG. 4). The piston valve 28 may include a needle valve, a pin valve, a spool valve or the like.

A controller 34 (illustrated schematically) operates each valve 18, 20, 28 and the fluid pump 22 to control flow of the incompressible fluid F. The controller 34 is also in communication with a sensor 36 such as a displacement sensor which determines the location of the piston 26 within the body 24. Other sensors, such as pressure sensors could also be used with the present invention.

The controller 34 operates each valve 18, 20, 28 and the fluid pump 22 to exploit the incompressible properties of the incompressible fluid F to obtain an infinitely variable suspension system. In response to operating requirements, the controller 34 selects a stiffness range to provide sufficient centering forces to return the system 10 to a desired center without overshoot. The controller 34 preferably minimizes any bouncing and therefore minimizes the requirement for energy wasting damping. It should be understood that various well known control algorithms will benefit from the present invention.

Generally, the amount of the incompressible fluid F disposed within the low pressure side 32 of the piston 26 and the high pressure side 30 of the piston 26 is controlled to determine values for the respective spring rate coefficients and dampening coefficients of the strut 12. The spring rate and dampening coefficients are selected to apply balancing forces which are equal to the sum of several force components. The incompressible fluid F absorbs perturbations within a predefined value.

Figure 2:
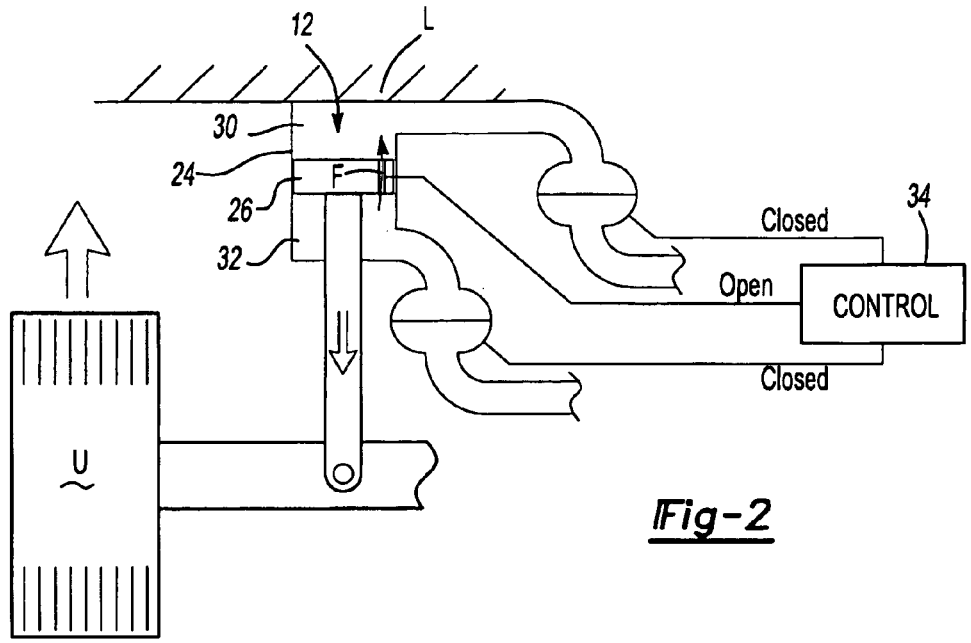
FIG. 2 is a general schematic view of an active suspension system in a first position.

The perturbations of a road surface also provides the pumping required to transfer fluid to the reservoir 16. In particular, control of the piston valve 28 permits adjustment of the strut 12 through motion provided by road perturbations. For example only, as the piston 26 extends over a road perturbation such as a dip, the controller 34 need only open the piston valve 28 to permit communication of fluid F from the low pressure side 32 of the piston 26 to the high pressure side 30 such that the strut 12 is permitted to extend (FIG. 2). By then closing the piston valve 28, the strut 12 has essentially increased in height without active pumping of fluid.

Figure 3:
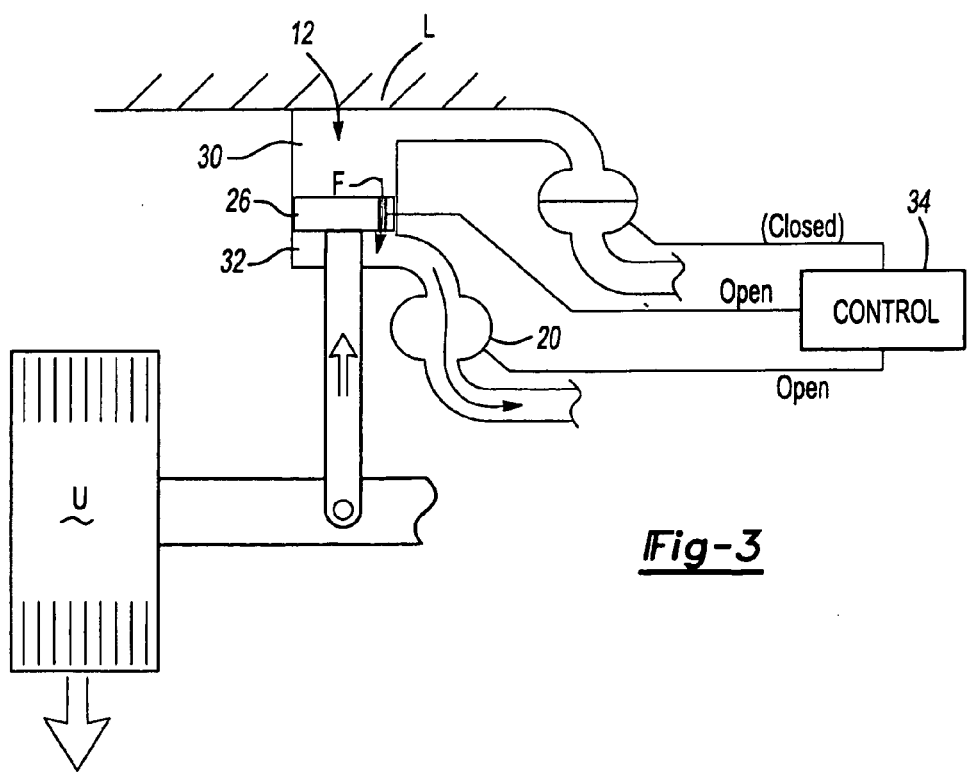
FIG. 3 is a general schematic view of an active suspension system in a second position.

Should perturbations above a predetermined value be experienced, the controller 34 selectively operates each valve 18, 20 to control flow of the incompressible fluid F into and out of the strut 12 so as to appropriately respond to the perturbations. For example only, should the piston 26 be rapidly compressed over a road perturbation such as a sharp rise, the controller 34 need only open the piston valve 28 and the reservoir valve 20 to permit communication of fluid F from the high pressure side 30 of the piston 26 to the low pressure side 32 and out of the strut 12 through the reservoir valve 20 to absorb the step-like rise (FIG. 3). It should be understood that this is a greatly simplified example and that the accumulator valve 18 may, for example, also be selectively opened to cushion compression of the strut 12 prior to the piston 26 reaching a hard stop or the like.

Referring to FIG. 4, the suspension system 10 provides a relatively constant system spring rate. The spring rate relates force applied to the systems 10 to the distance which the system 10 will travel in relation to perturbations. By opening or closing the piston valve 28 (FIG. 2 and 3), the system spring rate may immediately dissipated toward the origin as illustrated by the phantom vertical lines. That is, the system 10 operates at the system spring rate unless the force is "dumped" by the valve 28. The strut height, balance and timing of valve operation is performed by the controller 34 and the logic contained therein. As the valves are preferably ON/OFF valves responsiveness is quite high while actuation force is relatively low.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A suspension system comprising:
    a fluid strut containing an incompressible fluid;
    an accumulator in fluid communication with said fluid strut;
    a reservoir in fluid communication with said accumulator and said fluid strut;
    a first on/off valve between said accumulator and said fluid strut;
    a second on/off valve between said reservoir and said fluid strut;
    a piston movable within said fluid strut and including a piston valve operable to control a fluid flow between opposing sides of said piston; and
    a controller in communication with said first on/off valve and said second on/off valve to control fluid communication of said incompressible fluid from said accumulator to said fluid strut and from said fluid strut to said reservoir, and said controller in communication with said piston valve to control fluid flow through said piston.

2. The suspension system as recited in claim 1, wherein said first on/off valve is in fluid communication with one of said opposing sides of said piston and said second valve is in fluid communication with another of said opposing sides of said piston.

3. The suspension system as recited in claim 1, further comprising a fluid pump between said accumulator and said reservoir.

4. The suspension system as recited in claim 1 wherein said first and said second on/off valves are solely movable between a fully open position and a fully closed position.

5. The suspension system as recited in claim 1 wherein said first on/off valve comprises the only valve positioned between said accumulator and said fluid strut.

6. The suspension system as recited in claim 1 wherein said second on/off valve comprises the only valve positioned between said reservoir and said fluid strut.

7. The suspension system as recited in claim 1 including a sensor that senses a position of said piston within said fluid strut and generates a piston position signal that is communicated to said controller.

8. The suspension system as recited in claim 1 wherein said piston valve is controlled to allow adjustment of said fluid strut through road load inputs without requiring active pumping of fluid from a fluid pump.

9. The suspension system as recited in claim 8 wherein in response to a first type of road load input, said controller opens said piston valve to permit fluid communication from a low pressure side of said piston to a high pressure side of said piston to allow said piston to move from a compressed position to an extended position.

10. The suspension system as recited in claim 9 wherein in response to a second type of road load input, said controller opens said piston valve and said second on/off valve to allow fluid communication from said high pressure side of said piston to said low pressure side of said piston to allow said piston to move to the compressed position.

11. The suspension system as recited in claim 10 wherein said first type of road load input comprises a depression and said second type of road load input comprises a rise.

12. A method of controlling an active suspension system comprising the steps of:
    (a) controlling a flow of an incompressible fluid to a fluid strut, which includes a piston movable within a cylinder, with a first on/off valve positioned between an accumulator and a first side of the piston;

(b) controlling a flow of the incompressible fluid from the fluid strut with a second on/off valve positioned between a reservoir and a second side of the piston; and (c) controlling the flow of the incompressible fluid between said first and second sides of the piston with a piston valve positioned within the piston.

13. The method as recited in claim 12 including positioning only one valve between the fluid strut and the accumulator wherein the one valve comprises the first on/off valve.

14. The method as recited in claim 12 including positioning only one valve between the fluid strut and the reservoir wherein the one valve comprises the second on/off valve.

15. The method as recited in claim 12 including solely moving the first and second on/off valves between fully open and fully closed positions to adjust damping within the fluid strut as needed.

16. The method as recited in claim 12 including sensing a position of the piston within the cylinder, generating a piston position signal, communicating the piston position signal to a controller, and adjusting damping within the fluid strut based on the piston position signal.

17. The method as recited in claim 12 including controlling the piston valve to allow adjustment of the fluid strut through road load inputs without requiring active pumping of fluid into the fluid strut with a fluid pump.

18. The method as recited in claim 12 including opening the piston valve in response to a road load input to permit fluid communication from a low pressure side of the piston to a high pressure side of the piston to allow the piston to move from a compressed position to an extended position.

19. The method as recited in claim 18 including opening the piston valve and the second on/off valve in response to a road load input in a direction opposite from the road load input to allow fluid communication from the high pressure side of the piston to the low pressure side of the piston to allow the piston to move to the compressed position.

* * * * *

UNITED STATES PATENT AND TRADEMARK OFFICE
CERTIFICATE OF CORRECTION

| | | |
|---|---|---|
| PATENT NO. | : 7,229,079 B2 | |
| APPLICATION NO. | : 10/785880 | |
| DATED | : June 12, 2007 | |
| INVENTOR(S) | : Platner | |

It is certified that error appears in the above-identified patent and that said Letters Patent is hereby corrected as shown below:

ON THE TITLE PAGE:

The Assignee should read as follows:

(73) Assignee: ArvinMeritor Technology, LLC, Troy, MI (US)

Signed and Sealed this

Eleventh Day of September, 2007

JON W. DUDAS
*Director of the United States Patent and Trademark Office*